July 10, 1951  R. P. MOORE  2,559,784
BACK WASHING FILTER
Filed April 9, 1946
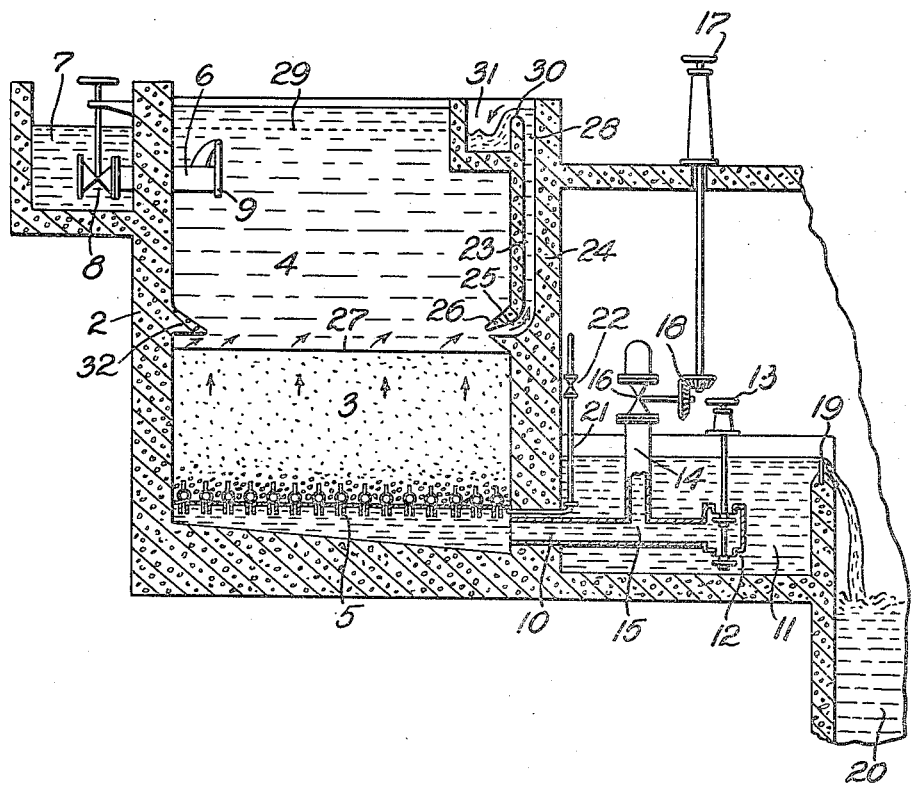
Inventor
R. P. Moore Patented July 10, 1951

2,559,784

UNITED STATES PATENT OFFICE 2,559,784

BACK WASHING FILTER

Richard Pierpont Moore, Roodekop, Germiston, Transvaal, Union of South Africa

Application April 9, 1946, Serial No. 660,661
In the Union of South Africa May 7, 1945

7 Claims. (Cl. 210—130)

This invention relates to rapid gravity sand filters suitable for purifying liquids (which includes water) and having means for back-washing the filter bed. The term "water" is used in the specification to mean specifically liquid used for backwashing the filter bed. The term rapid sand filter is used to describe a type of filter without necessarily specifying the material of which the filter bed is composed.

In such filter it is usual to make the filter chamber of substantial depth to carry the necessary head of liquid above the filter bed. It is customary to lower the liquid level before back washing is started, thereby wastefully consuming the time necessary for the body of liquid to drain through the bed and upsetting the continuity of operation of the whole plant. The present invention enables back washing to be carried out without lowering the level in the filter chamber.

It is a known practice to provide in the base of the filter chamber and at one side of the filter bed, a weir over which the back-washing water is passed to a waste gutter, after it has flowed upward through the filter bed. This arrangement causes the wash water that emerges from the surface of the filter bed, to flow horizontally over said surface and towards said weir. This horizontal flow is useful in sweeping dirt from the surface, but the waste gutter diminishes the useful area of the filter chamber in plan. The present invention enables the horizontal sweep to be attained while the full area of the floor of the filter chamber is occupied by the filter bed.

A process of back washing a rapid gravity sand filter according to this invention consists in shutting off the flow of raw liquid to the filter chamber passing wash water upwardly through the bed while the chamber still retains a substantial body of such liquid over the bed, and simultaneously withdrawing water from a position within said body and near the surface of the filter bed. According also to the invention, the withdrawal position is so situated that wash water flowing from the bed tends to pass directly to said withdrawal position and so that no substantial flow of liquid takes place to said withdrawal position from the main body of liquid above the level of said position. The invention further consists in effecting such withdrawal through a channel so restricted in area that the rate of flow through it ensures that any suspended solid matter that once becomes entrained in the withdrawing current will thereafter be transported out of the filter chamber with certainty.

To obtain the horizontal sweeping flow, the withdrawal is effected through an orifice that is long and narrow. Its length is preferably equal to the greatest dimension of the filter bed in one horizontal direction. By suitable limitation of the height of the orifice above the surface of the bed, lines drawn from any points of the bed surface to the orifice have preponderatingly horizontal direction components.

According to a further feature of the invention, before the withdrawal of wash water is commenced, the floc and dirt is projected from the filter bed up into the body of liquid overlying said bed, by means of fluid driven up through the filter. Said fluid may be either the back washing water or air or both in admixture. The projected matter is allowed to re-settle; and its heavier constituents falling first are entrained in the outflow which has by then been started. The outflow is stopped before the lighter and cleaner floc re-settles so that said floc re-settles on the filter bed and re-conditions the latter for prompt re-use.

According to a further feature of the invention, before the outflow is started, the filter bed is subjected to violent agitation as by air and water, likely to project the sand of the bed up into the main body of liquid.

Filter apparatus according to the invention comprises the usual filter chamber, a sand bed at the bottom of the chamber, and means to pass back-washing water through the filter bed. The filter bed is preferably supported on a system of channeling whereby filtered liquid is collected extensively over the area of the filter bed and wash water is similarly distributed over said area.

In addition, the apparatus comprises means to withdraw water from the filter chamber at a level above the level of the surface of the filter bed and substantially below the normal working level of the liquid in the filter chamber, without substantial admixture therewith of liquid from said body of liquid.

According also to the invention, apparatus as last described comprises an unobstructed conduit providing a discharge end isolated from the body of liquid in the filter chamber and an inflow end in the chamber above and near to the surface of the filter bed. Said discharge end is open to the atmosphere and the conduit is unobstructed. The level of the discharge lip is above the normal working level of the body of liquid in the filter chamber, so that outflow from the conduit is automatically started by the raising of the liquid level by the inflow of the back washing water, and is automatically stopped by the restoration of the normal working level after the back-washing inflow has ceased. The distance of the discharge lip above the normal level may be such that there is an appreciable delay while the incoming wash water is raising the level from the normal to that of the discharge lip, during which interval the violent agitation, above referred to, may be carried out.

An embodiment of the invention is illustrated in the drawing which is a sectional view of apparatus according to the invention.

In the drawing, the filter chamber 2 is of the usual rectangular form in plan and is deep enough to contain a filter bed 3 of proper thickness, together with a body of liquid 4 over the filter bed 3, deep enough to provide the necessary static head over said filter bed. The bed 3 is supported on a system of channeling 5 and extends over the whole area of the filter chamber 2 in plan.

The inflow pipe 6 from the feed reservoir 7 comprises the control valve 8 and a non-return valve 9, to prevent reversal of flow when the liquid level in the filter chamber rises above that in said feed reservoir. This rise occurs during backwashing, so that closing of the valve 9 occurs automatically, to shut off inflow to the chamber.

The outflow conduit 10 for filtered liquid, which discharges into the tank 11, has the usual shut off valve 12 at its outlet end, said valve being controlled by handwheel 13, and in addition it has the pipe 14 communicating with it at a point marked 15 between said shut off valve 12 and the filter chamber 2. The pipe 14 is connected to the wash water source (not shown) and a valve 16 is provided in said pipe 14 to control the flow of wash water into the conduit 10, said valve being operated by handwheel 17 through gearing 18. The tank 11 discharges over a weir 19 into the reservoir 20.

Compressed air may be admitted under the filter bed 3 through pipe 21 which comprises the control valve 22.

A discharge conduit 23 is provided in the wall 24, the lower end 25 communicating with the chamber 2 in a long and narrow orifice with a downwardly sloping ledge 26 along its whole length constituting its upper lip. Said orifice is only a short distance above the surface 27 of the filter bed 3. The discharge end 28 of the conduit 23 is permanently open and is elevated to be appreciably above the normal working level 29 of the water in the filter chamber 2 but below the top of the chamber 2. Said discharge end provides a weir 30 over which water which has passed up the conduit 23 is discharged into a waste trough 30.

In the use of the apparatus above described the inflow to the filter chamber 2 through pipe 6 and the outflow of filtered liquid therefrom through conduit 10 are both shut off by means of valves 9 and 12 respectively.

The bed 3 is agitated with air through pipe 21 if desired, but in any case, back washing water is admitted to the underside of the filter bed 3 via pipes 14 and 10 and emerges at the surface 27. This causes the level of the body of liquid 4 in the filter chamber 2 to rise, and at least to some extent floc from the bed is driven up into the body of liquid 4.

The level of liquid in the conduit 23 rises with that of the body of liquid 4 in the chamber 2; and as soon as the level in the conduit rises above the weir 30, liquid begins to discharge from the conduit 23 into the waste trough 31. Upon that occurring, no material change of level of the body of liquid 4 takes place; and the back washing water which continues to enter the chamber 2 through the bed 3 flows by the shortest route to the lower end 25 of the conduit 23; thence up the conduit and over the weir 30 to waste, thus by-passing the main body of water in the filter chamber. The flow is thus to a large extent horizontal over the filter bed as indicated by the arrows in the drawing, and the rate of flow increases towards the inlet end 25 of the conduit. It is advantageous to provide a horizontal projection, such as that marked 32, from the wall opposite to the orifice 25, in order to assist and promote such horizontal flow.

During the initial period of cleansing—that is while the level of the body of liquid is being raised and there is no flow over the weir 30—floc and dirt in the bed are projected upwardly into the body of liquid either by backwash water or air or both. When the level of the liquid reaches that of the weir 30 and flow over the weir commences, substantially all further washwater emerging from the bed does not pass into the body of liquid but flows in a horizontal current towards the inlet end 25 of the conduit 23, sweeping across the surface of the bed 3 and by-passing the body of liquid in the chamber. The projection such as 32 promotes such horizontal flow. Floc and dirt which may have been projected into the body prior to commencement of withdrawal of washwater settle out gravitationally. As they do so, they enter the horizontal current of washwater and become entrained in it, being thereby withdrawn from the chamber through the conduit 23. Dirt subsequently driven up out of the bed enters the current and is withdrawn by it.

It is the case that the horizontal current is mainly composed of washwater and of floc and dirt entrained in the current either as the result of resettlement or as a result of ejectment from the bed by washwater after the current has started to flow. The current is to a substantial degree free from admixed liquid from the body of liquid.

The resettlement time of particles of projected floc and dirt differs according to their specific gravity, the heavier particles settling first. The flow of backwashing water may be arrested before the lighter constituents of the projected water settle sufficiently to enter the horizontal current; so that the heavier constituents become entrained in the current whereas lighter matter settles back on the bed.

Upon valve 16 being closed to shut off the backwashing supply, the liquid level in the chamber 2 falls to the weir level, whereupon discharge ceases. The filter chamber 2 is left full of liquid and does not have to be re-filled.

Before the regular inflow to the chamber is restarted a suitable interval of time is allowed for the lighter portion of the floc, that was driven up out of the body of liquid, to settle back on the filter bed 3; and the period before resuming full-rate filtering is minimized accordingly, as such re-settled floc forms an effective film on the surface of the filter bed.

I claim:

1. A process of backwashing a rapid gravity sand filter which consists in passing washwater upwardly through the bed to enter the body of liquid in the filter chamber and raise the level of the body and to project floc and dirt in the bed upwardly; when such level has reached a predetermined height, automatically biassing further washwater emerging from the bed to flow in a horizontal current sweeping across the surface of the bed; withdrawing washwater in the current from the chamber without substantial admixture of liquid from the body of liquid, and continuing such withdrawal while projected floc and dirt settle in the body of liquid and, entering the current, are entrained in it and withdrawn from the chamber.

2. The process claimed in claim 1 in which flow of washwater is arrested before the lighter constituents of the projected floc and dirt have settled sufficiently to enter the withdrawing current.

3. A process of backwashing a rapid gravity sand filter which consists in passing washwater upwardly through the bed while maintaining a substantial body of liquid over the bed, biassing washwater emerging from the bed to flow in a substantially horizontal current sweeping across the surface of the bed and byepassing the body of liquid; and withdrawing washwater in the current from the chamber substantially free of admixture with liquid from the body of liquid.

4. A rapid gravity sand filter comprisng a filter chamber, a sand bed forming the bottom of the chamber, means to pass back-washing water upwardly through said bed, an unobstructed conduit the inflow end of which is positioned within the chamber above and near to the surface of said bed at one wall of the chamber to one side of the bed, and the outflow end of which is isolated from the liquid and is above the normal working level of the body of liquid in the filter when the filter is in use and below the level of the top of the chamber, and comprising a horizontal projection extending into the chamber and positioned substantially at the same height above the bed as the inflow end of the conduit, and directed across the chamber from such end.

5. The process claimed in claim 3 in which water is withdrawn from a position which is at one side of the bed so that wash water flowing upwardly through said bed tends to pass directly to said withdrawal position in a substantially horizontal current sweeping the surface of the bed, byepassing the body of liquid in the chamber and so that no substantial flow of liquid takes place to said withdrawal position from the main body above the level of said position.

6. The process claimed in claim 3 in which wash water is flowed upwardly into the body of liquid in the chamber to project floc and dirt upwardly from the filter bed into the said body of liquid before withdrawal of said wash water is commenced.

7. A process of back-washing a rapid gravity sand filter comprising the steps of subjecting the filter bed, while the filter chamber contains a substantial body of raw liquid, to violent agitation adapted to project sand from the bed, together with dirt and floc lying on the bed, upwardly into the said body of raw liquid in the filter chamber, byepassing air upwardly through said filter bed, thereafter passing wash water upwardly through said bed, and while passing said wash water through the bed, simultaneously withdrawing water from a position within said body and near to the surface of said filter bed, the water being withdrawn from a position which is at one side of the bed so that wash water flowing upwardly through said bed tends to pass directly to said withdrawal position in a horizontal current which sweeps the surface of the bed, byepassing the body of liquid in the chamber, and so that no substantial flow of water takes place to said withdrawal position from the main body of liquid above the level of said position.

RICHARD PIERPONT MOORE.

REFERENCES CITED

The following references are of record in the file of this patent:

UNITED STATES PATENTS

| Number | Name | Date |
|---|---|---|
| 307,325 | Pattison | Oct. 28, 1884 |
| 879,876 | Jones et al. | Feb. 25, 1908 |
| 981,098 | McCaskell | Jan. 10, 1911 |
| 1,634,783 | Hungerford | July 5, 1927 |
| 1,751,819 | Kniesel | Mar. 25, 1930 |
| 2,053,628 | Paterson | Sept. 8, 1936 |
| 2,108,168 | Jenks | Feb. 15, 1938 |